(12) United States Patent  (10) Patent No.: US 8,686,599 B2
Tsuchiya et al.  (45) Date of Patent: Apr. 1, 2014

(54) POWER TRANSMISSION SYSTEM AND POWER RECEIVING JACKET

(71) Applicant: Murata Manufacturing Co., Ltd., Nagaokakyo (JP)

(72) Inventors: Takanori Tsuchiya, Nagaokakyo (JP); Kazuya Kato, Kyoto-Fu (JP)

(73) Assignee: Murata Manufacturing Co., Ltd., Nagaokakyo-shi, Kyoto-Fu (JP)

( * ) Notice: Subject to any disclaimer, the term of this patent is extended or adjusted under 35 U.S.C. 154(b) by 0 days.

(21) Appl. No.: 13/858,694

(22) Filed: Apr. 8, 2013

(65) Prior Publication Data

US 2013/0249313 A1  Sep. 26, 2013

Related U.S. Application Data

(63) Continuation of application No. PCT/JP2012/060545, filed on Apr. 19, 2012.

(30) Foreign Application Priority Data

Apr. 20, 2011 (JP) .................................. 2011-093771

(51) Int. Cl.
*H02M 3/06* (2006.01)
*H01F 27/42* (2006.01)
(52) U.S. Cl.
CPC . *H02M 3/06* (2013.01); *H01F 27/42* (2013.01)
USPC .......................................... 307/109; 107/104
(58) Field of Classification Search
CPC .................................. H01F 38/14; H04B 5/00
USPC ......................................................... 307/107
See application file for complete search history.

(56) References Cited

U.S. PATENT DOCUMENTS 8,242,638 B2   8/2012  Camurati et al.
2008/0067874 A1*  3/2008  Tseng ............................ 307/104

(Continued)

FOREIGN PATENT DOCUMENTS

| CN | 101364747 A | 2/2009 |
|----|-------------|--------|
| JP | 2007244165 A | 9/2007 |
| JP | 2009-531009 A | 8/2009 |
| JP | 2009-296857 A | 12/2009 |

OTHER PUBLICATIONS

PCT Written Opinion of the International Searching Authority.

*Primary Examiner* — Stephen W Jackson
*Assistant Examiner* — Toan Vu
(74) *Attorney, Agent, or Firm* — Dickstein Shapiro LLP

(57) ABSTRACT

A power transmission system and a power receiving jacket is provided that enhances the transmission efficiency of electric power with a simple structure and without increasing manufacturing costs. The power transmission system includes a power transmitting device having a first passive electrode, a first active electrode whose potential is higher than the first passive electrode, and a voltage generation circuit connected between the first passive electrode and the first active electrode, a power receiving jacket having a second active electrode and a power receiving circuit module connected to the second active electrode, and an electronic device attachable to the power receiving jacket. The electronic device includes a chassis having a conductive portion formed from a conductive material along a surface facing the first passive electrode, and the power receiving circuit module is electrically connected between the conductive portion and the second active electrode.

17 Claims, 10 Drawing Sheets

(56) References Cited

U.S. PATENT DOCUMENTS

2009/0206675 A1 8/2009 Camurati et al.
2009/0237907 A1* 9/2009 Kunimoto et al. ............ 361/818
2009/0302690 A1 12/2009 Kubono et al.
2012/0262005 A1 10/2012 Camurati et al.
2012/0267959 A1 10/2012 Camurati et al.
2012/0267963 A1 10/2012 Camurati et al.

* cited by examiner

POWER TRANSMISSION SYSTEM AND POWER RECEIVING JACKET

CROSS REFERENCE TO RELATED APPLICATIONS

The present application is a continuation of International Application No. PCT/JP2012/060545, filed Apr. 19, 2012, which claims priority to Japanese Patent Application No. 2011-093771, filed Apr. 20, 2011, the entire contents of each of which are incorporated herein by reference.

FIELD OF THE INVENTION

The present invention relates to a power transmission system transmitting electric power without being physically connected and a power receiving jacket used in the corresponding power transmission system.

BACKGROUND OF THE INVENTION

In recent years, many electronic devices transmitting electric power in a non-contact manner have been developed. So as to transmit electric power in a non-contact manner in electronic devices, in many cases a power transmission system based on a magnetic field coupling method is adopted where coil modules are provided in both of a power transmitting unit for electric power and a power receiving unit for electric power.

However, in the magnetic field coupling method, the intensity of a magnetic flux passing through each coil module is greatly influenced by an electromotive force, and so as to transmit electric power with high efficiency, high accuracy is required for positioning of relative positions in a coil planar direction of a coil module on a power transmitting unit side (primary side) and a coil module on a power receiving unit side (secondary side). In addition, since the coil modules are used as coupling electrodes, the miniaturization of the power transmitting unit and the power receiving unit is difficult. Furthermore, in an electronic device or the like, it is necessary to consider an influence on a storage battery due to the heat generation of a coil, and there has occurred a problem that it becomes a bottleneck on layout design.

Therefore, for example, a system for transmitting electric power using an electrostatic field is disclosed. In Patent Document 1, an energy carrying device is disclosed where a high power transmission efficiency is realized by forming a strong electric field between a coupling electrode on a power transmitting unit side and a coupling electrode on a power receiving unit side. In Patent Document 1, a passive electrode having a relatively large size and an active electrode having a small size are provided on the power transmitting unit side, and a passive electrode having a relatively large size and an active electrode having a small size are also provided on the power receiving unit side. By forming the strong electric field between the active electrode on the power transmitting unit side and the active electrode on the power receiving unit side, the high power transmission efficiency is realized. So as to form the strong electric field, there are taken a measure such as shortening a distance between electrodes on the power transmitting unit side and the power receiving unit side or increasing a facing area between electrodes facing each other.

Patent Document 1: Japanese Unexamined Patent Application Publication (Translation of PCT Application) No. 2009-531009

Recently, in even an electronic device not having a non-contact power transmission function, so as to be able to transmit electric power without being physically connected, a power receiving jacket capable of transmitting electric power from an external power transmitting unit in a non-contact manner is attached to the electronic device, and it is possible to transmit electric power through the power receiving jacket to the electronic device, by forming a strong electric field between a coupling electrode of the power receiving jacket and a coupling electrode on the power transmitting unit side. FIG. 1 is a schematic view illustrating the configuration of a non-contact power transmission system at the time of attachment of a power receiving jacket of the related art.

In FIG. 1, in a power transmitting stand (power transmitting unit) 1 including a power transmitting module 10, a passive electrode 11p is provided in a surface to which a power receiving jacket 2 is attached and which supports the power receiving jacket 2, and an active electrode 11a is provided in a surface to which the power receiving jacket 2 is attached. A power receiving unit 4 includes the power receiving jacket 2 to which an electronic device 3 is attached, and the power receiving jacket 2 includes a power receiving circuit module 27 and a DC-DC converter 24. In the power receiving jacket 2, an active electrode 21a is disposed at a position facing the active electrode 11a provided in the surface of the power transmitting stand 1 to which the power receiving jacket 2 is attached, and an passive electrode 21p is disposed at a position facing the passive electrode 11p provided in the surface of the power transmitting stand 1 to which the power receiving jacket 2 is attached and which supports the power receiving jacket 2. As is understood from FIG. 1, while it is possible for the active electrode 11a in the power transmitting stand 1 and the active electrode 21a in the power receiving jacket 2 to secure a sufficient facing area, it is difficult for the passive electrode 11p in the power transmitting stand 1 and the passive electrode 21p in the power receiving jacket 2 to secure a sufficient facing area. Accordingly, there has been a problem that it is difficult to enhance the transmission efficiency of electric power.

On the other hand, FIG. 2 is a schematic view illustrating another configuration of the non-contact power transmission system at the time of attachment of the power receiving jacket 2 of the related art. FIG. 2 is different from FIG. 1 in that the passive electrode 21p in the power receiving jacket 2 is stretched to a position where it is possible for the passive electrode 21p to face the surface of the power transmitting stand 1, which supports the power receiving jacket 2. In doing this way, it is also possible to secure a sufficient facing area with respect to the passive electrode 11p in the power transmitting stand 1 and the passive electrode 21p in the power receiving jacket 2 and it is possible to enhance the transmission efficiency of electric power. However, since it is necessary to increase the size of the passive electrode 21p in the power receiving jacket 2, there has been a problem that a manufacturing cost increases.

SUMMARY OF THE INVENTION

The present invention is made in view of the above-mentioned situation, and an object thereof is to provide a power transmission system and a power receiving jacket, which enhance the transmission efficiency of electric power with a simple structure and without increasing a manufacturing cost.

In order to accomplish the above-mentioned purpose, a power transmission system according to the present invention includes a power transmitting device having a first passive electrode, a first active electrode whose potential is higher than the first passive electrode, and a voltage generation circuit connected between the first passive electrode and the first active electrode, a power receiving jacket having a second active electrode and a power receiving circuit module connected to the second active electrode, and an electronic device attachable to the power receiving jacket, wherein a chassis of the electronic device includes a conductive portion formed using a conductive material along a surface facing the first passive electrode when the power receiving jacket is attached to the power transmitting device, and the power receiving circuit module is electrically connected between the conductive portion and the second active electrode.

In the above-mentioned configuration, when the electronic device to be a target of electric power transmission is attached to the power transmitting device via the power receiving jacket, the chassis of the electronic device includes the conductive portion formed, using the conductive material, along the surface facing the first passive electrode. Therefore, the whole chassis of the electronic device or the conductive portion of the chassis of the electronic device, the conductive portion being formed using the conductive material, functions as a passive electrode and it is possible to transmit electric power. In addition, since a facing area between the passive electrodes becomes wider, the transmission efficiency of electric power is improved, and it is not necessary to separately provide a passive electrode in the power receiving jacket, it becomes possible to reduce a manufacturing cost.

In addition, in the power transmission system according to the present invention, it is desirable that the power receiving jacket includes a second passive electrode electrically connected to the conductive portion.

In the above-mentioned configuration, by the power receiving jacket including the second passive electrode electrically connected to the conductive portion, the potential of the conductive portion serving as the whole or a portion of the chassis of the electronic device and the potential of the second passive electrode are put into a common potential, and the chassis of the electronic device functions as an extension portion of the second passive electrode in the power receiving jacket. Therefore, coupling capacitance between the passive electrodes is increased and the transmission efficiency of electric power is improved.

In addition, in the power transmission system according to the present invention, it is desirable that the second passive electrode in the power receiving jacket is electrically connected to the first passive electrode in the power transmitting device.

In the above-mentioned configuration, by the second passive electrode in the power receiving jacket being electrically connected to the first passive electrode in the power transmitting device, the potential of the second passive electrode in the power receiving jacket is stabilized without fluctuation and the transmission efficiency of electric power is further improved.

In addition, in the power transmission system according to the present invention, it is desirable that the first active electrode and the first passive electrode in the power transmitting device are provided in a surface facing a rear face of the power receiving jacket when the power receiving jacket is attached, and the second active electrode in the power receiving jacket is provided at a position facing the first active electrode in the power transmitting device.

In the above-mentioned configuration, the first active electrode and the first passive electrode in the power transmitting device are provided in the surface facing the rear face of the power receiving jacket when the power receiving jacket is attached, and the second active electrode in the power receiving jacket is provided at the position facing the first active electrode in the power transmitting device. Therefore, even if the power receiving jacket is vertically disposed in and attached to the power transmitting device or transversely disposed in and attached to the power transmitting device, it becomes possible to effectively transmit electric power without depending on a direction in which the power receiving jacket is attached.

In order to accomplish the above-mentioned purpose, a power receiving jacket according to the present invention is a power receiving jacket to which electric power is transmitted from a power transmitting device in a non-contact manner and to which an electronic device to be a target of electric power transmission is attachable, the power transmitting device including a first passive electrode, a first active electrode whose potential is higher than the first passive electrode, and a voltage generation circuit connected between the first passive electrode and the first active electrode, wherein the electronic device is caused to be attachable that includes a conductive portion formed using a conductive material along a surface of a chassis, which faces at least the first passive electrode, a second active electrode and a power receiving circuit module configured to be connected to the second active electrode are included, and the power receiving circuit module is electrically connected between the conductive portion and the second active electrode.

In the above-mentioned configuration, the power receiving jacket can be attached to the power transmitting device when the electronic device is attached thereto. Since the chassis of the electronic device includes the conductive portion formed, using the conductive material, along the surface facing at least the first passive electrode, the whole chassis of the electronic device or the conductive portion of the chassis of the electronic device, the conductive portion being formed using the conductive material functions as a passive electrode, it is possible to transmit electric power and a facing area between the passive electrodes becomes wider. Therefore, since the transmission efficiency of electric power is improved, and it is not necessary to separately provide a passive electrode in the power receiving jacket, it becomes possible to reduce a manufacturing cost.

In addition, it is desirable that the power receiving jacket according to the present invention includes a second passive electrode configured to be electrically connected to the conductive portion.

In the above-mentioned configuration, by including the second passive electrode electrically connected to the conductive portion, the potential of the conductive portion serving as the whole or a portion of the chassis of the electronic device and the potential of the second passive electrode are put into a common potential, and the chassis of the electronic device functions as an extension portion of the second passive electrode in the power receiving jacket. Therefore, coupling capacitance between the passive electrodes is increased and the transmission efficiency of electric power is improved.

In addition, in the power receiving jacket according to the present invention, it is desirable that the second passive electrode is electrically connected to the first passive electrode in the power transmitting device.

In the above-mentioned configuration, by the second passive electrode being electrically connected to the first passive electrode in the power transmitting device, the potential of the second passive electrode in the power receiving jacket is stabilized without fluctuation and the transmission efficiency of electric power is further improved.

In addition, in the power receiving jacket according to the present invention, it is desirable that when the first active electrode and the first passive electrode in the power transmitting device are provided in a surface facing a rear face when attached to the power receiving jacket, the second active electrode is provided at a position facing the first active electrode in the power transmitting device.

In the above-mentioned configuration, when the first active electrode and the first passive electrode in the power transmitting device are provided in the surface facing the rear face when attached to the power receiving jacket, the second active electrode is provided at the position facing the first active electrode in the power transmitting device. Therefore, even if the power receiving jacket is vertically disposed in and attached to the power transmitting device or transversely disposed in and attached to the power transmitting device, it becomes possible to effectively transmit electric power without depending on a direction in which the power receiving jacket is attached.

According to the above-mentioned configuration, when the electronic device to be a target of electric power transmission is attached to the power transmitting device via the power receiving jacket, the chassis of the electronic device includes the conductive portion formed, using the conductive material, along the surface facing the first passive electrode. Therefore, the whole chassis of the electronic device or the conductive portion of the chassis of the electronic device, the conductive portion being formed using the conductive material functions as a passive electrode and it is possible to transmit electric power. In addition, since a facing area between the passive electrodes becomes wider, the transmission efficiency of electric power is improved, and it is not necessary to separately provide a passive electrode in the power receiving jacket, it becomes possible to reduce a manufacturing cost.

DETAILED DESCRIPTION OF THE PREFERRED EMBODIMENTS OF THE INVENTION

Hereinafter, a power transmission system and a power receiving jacket used in the power transmission system in embodiments of the present invention will be specifically described with reference to drawings. The following embodiments are not intended to limit the inventions described in the Claims, and it is to be noted that all of the combinations of characteristic matters described in the embodiments are not essential to a solution to a problem.

Figure 1:
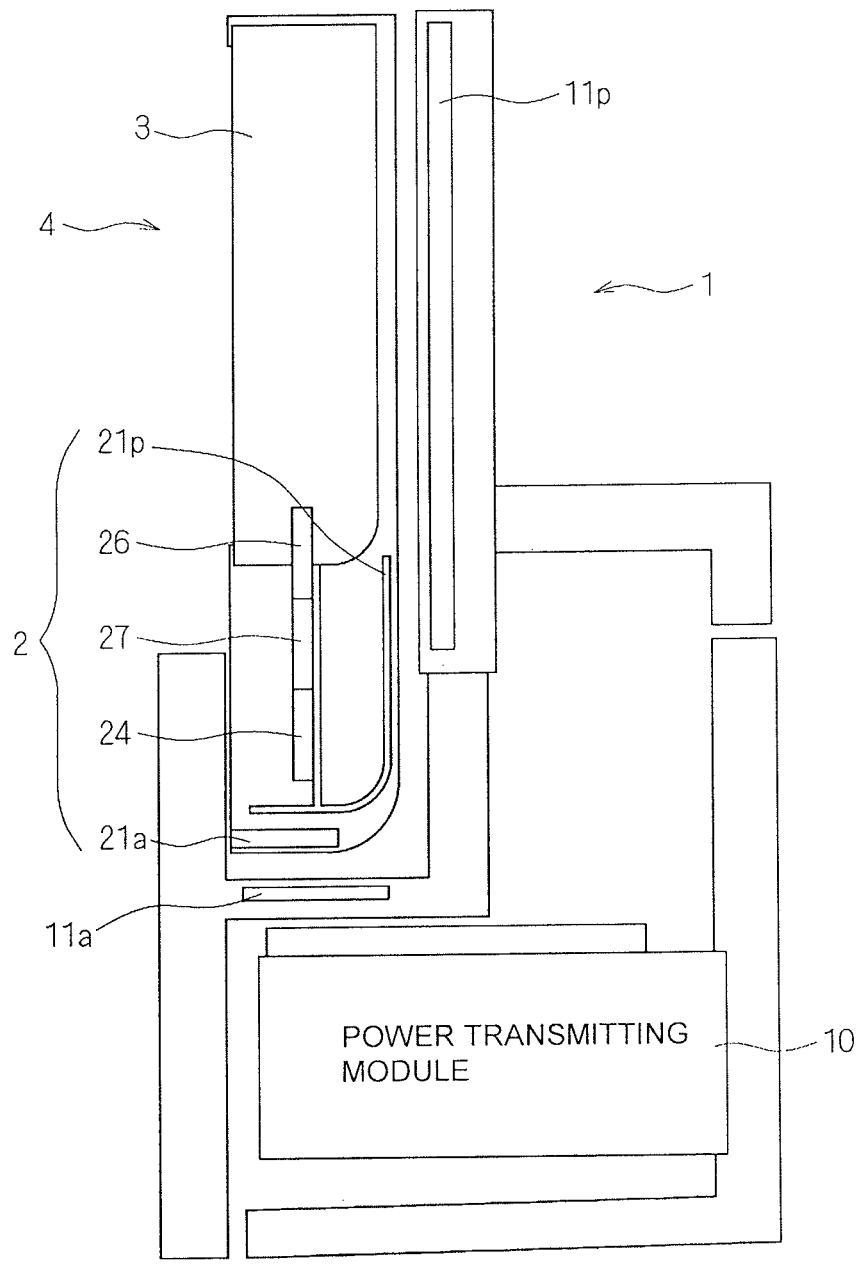
FIG. 1 is a schematic view illustrating a configuration of a non-contact power transmission system at the time of attachment of a power receiving jacket of the related art.
Figure 2:
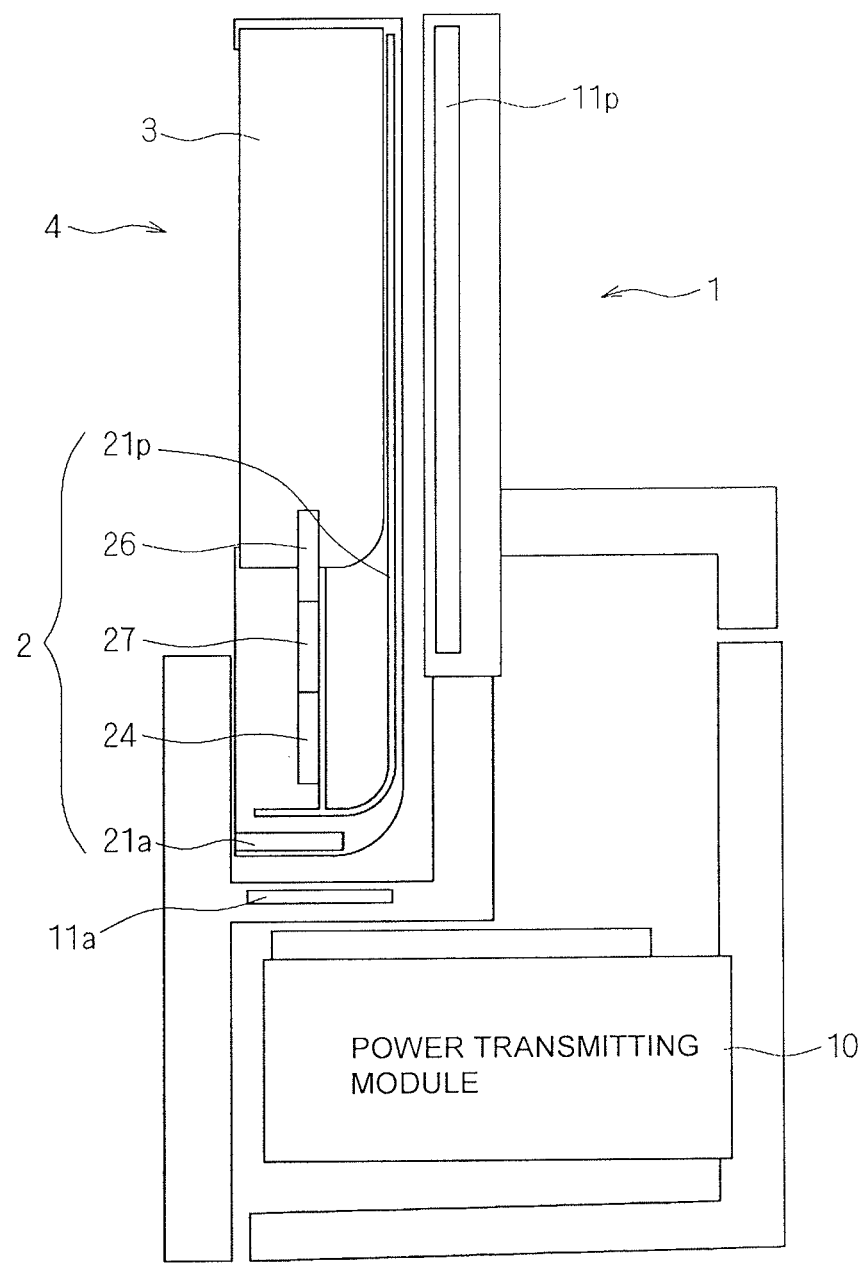
FIG. 2 is a schematic view illustrating another configuration of a non-contact power transmission system at the time of attachment of a power receiving jacket of the related art.
Figure 3:
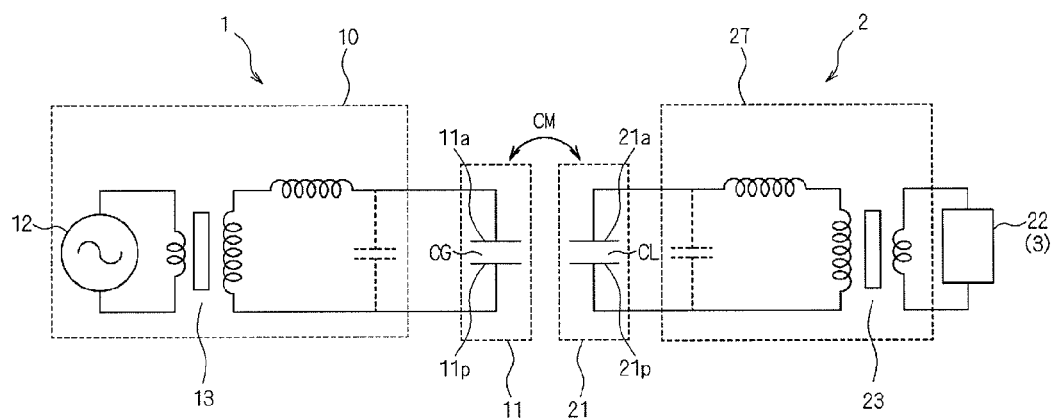
FIG. 3 is a circuit diagram schematically illustrating a configuration of a power transmission system according to an embodiment 1 of the present invention.

FIG. 3 is a circuit diagram schematically illustrating the configuration of a power transmission system according to an embodiment 1 of the present invention. As illustrated in FIG. 3, a power transmitting device 1 in the power transmission system according to the embodiment 1 includes a power transmitting module 10 including at least a voltage generation circuit 12 and a step-up transformer 13, and a coupling electrode 11. In the equivalent circuit in FIG. 3, an alternating-current voltage whose frequency is 10 kHz to 10 MHz and which is generated in the voltage generation circuit 12 is stepped up by the step-up transformer 13, an active electrode (first active electrode) $11a$ is put into a high voltage, and a passive electrode (first passive electrode) $11p$ is put into a low voltage.

As further shown, a power receiving jacket 2 includes a power receiving circuit module 27 including at least a step-down transformer 23, and a coupling electrode 21. In the equivalent circuit in FIG. 3, capacitance CG is capacitance between the active electrode (first active electrode) $11a$ and the passive electrode (first passive electrode) $11p$ in the power transmitting device 1. Capacitance CL is capacitance between an active electrode (second active electrode) $21a$ and a passive electrode (second passive electrode) $21p$ in the power receiving jacket 2. Capacitance CM corresponds to capacitance between the active electrode (first active electrode) $11a$ in the power transmitting device 1 and the active electrode (second active electrode) $21a$ in the power receiving jacket 2. In addition, while, in FIG. 3, a resonant circuit is included and described, this is for the sake of enhancing the stability of electric power transmission, and the resonant circuit is not always indispensable.

Figure 4:
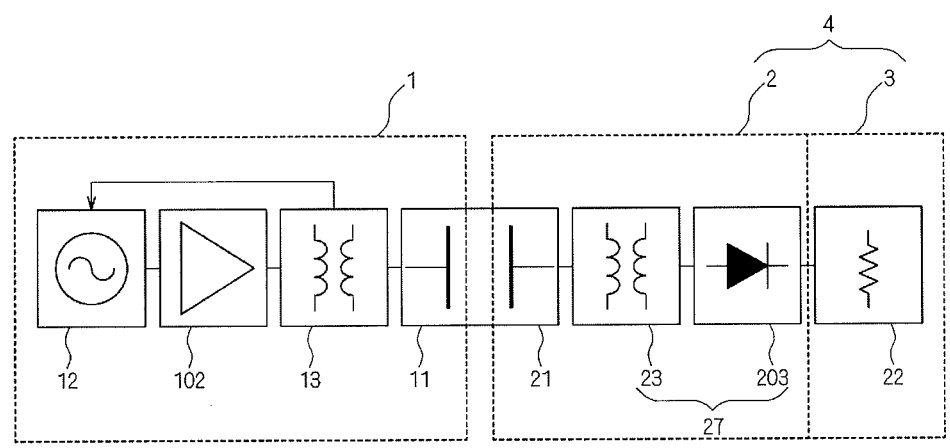
FIG. 4 is a functional block diagram schematically illustrating a configuration of the power transmission system according to the embodiment 1 of the present invention.

FIG. 4 is a functional block diagram schematically illustrating the configuration of the power transmission system according to the embodiment 1 of the present invention. As illustrated in FIG. 4, the alternating-current voltage supplied from the voltage generation circuit 12 in the power transmitting device 1 is amplified by an amplifier 102, stepped up by the step-up transformer 13, and supplied to the coupling electrode 11. The voltage generation circuit 12, the amplifier 102, the step-up transformer 13, and the coupling electrode 11 are embedded in a power transmitting stand described later. The alternating-current voltage transmitted from the coupling electrode 11 in the power transmitting device 1 to the coupling electrode 21 in the power receiving jacket 2 is stepped down by the step-down transformer 23, and supplied to a load circuit 22 after having been rectified by a rectifier 203.

Figure 5:
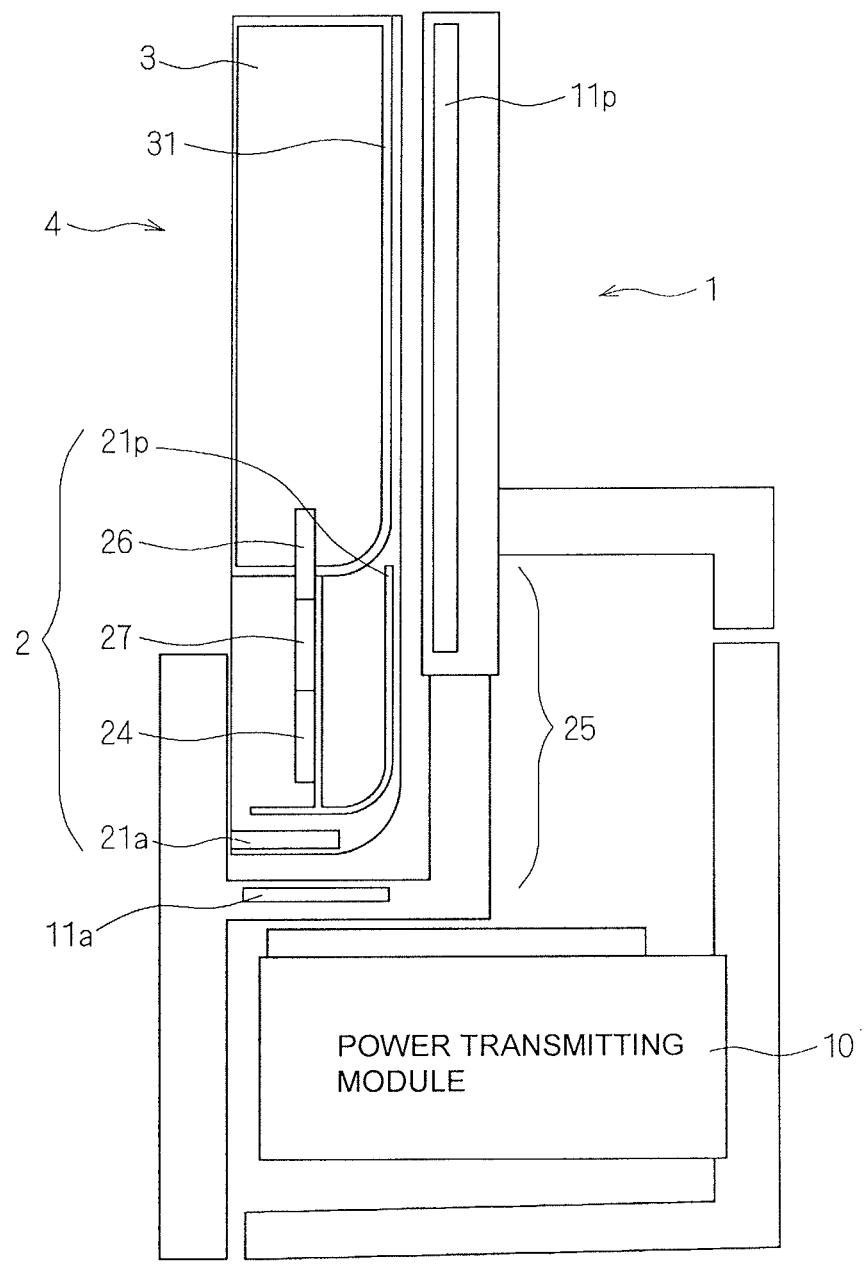
FIG. 5 is a schematic view illustrating a configuration of the power transmission system according to the embodiment 1 of the present invention.

FIG. 5 is a schematic view illustrating the configuration of the power transmission system according to the embodiment 1 of the present invention. In FIG. 5, in the power transmitting device (hereinafter, a power transmitting stand) 1 including the power transmitting module 10, the passive electrode $11p$ is provided in a surface to which the power receiving jacket 2 is attached and which supports the power receiving jacket 2, and the active electrode $11a$ is provided in a surface to which the power receiving jacket 2 is attached. A power receiving unit 4 includes the power receiving jacket 2 to which the electronic device 3 is attached, and the power receiving jacket 2 includes a power receiving circuit module 27 and a DC-DC converter 24. In the power receiving jacket 2, the active electrode $21a$ is disposed at a position facing the active electrode 11a provided in the surface on a basal side when attached to the power transmitting stand, and the passive electrode 21p is disposed at a position facing the passive electrode 11p provided in the surface of the power transmitting stand 1 to which the power receiving jacket 2 is attached and which supports the power receiving jacket 2, the passive electrode 21p being disposed within a range where a housing portion 25 housing the power receiving circuit module 27 and the DC-DC converter 24 stands opposite therewith.

The electronic device 3 is attached to the power receiving jacket 2 through a connector 26. The connector 26 is electrically connected to the power receiving circuit module 27 and the DC-DC converter 24, caused to protrude from the housing portion 25, and conductively connected to the active electrode (second active electrode) 21a and the passive electrode (second passive electrode) 21p.

The power receiving circuit module 27 includes the step-down transformer 23 and the rectifier 203. In other words, the transmitted alternating-current voltage is stepped down by the step-down transformer 23, and adjusted to a constant voltage by the DC-DC converter 24 after having been rectified and converted into a direct-current voltage by the rectifier 203.

A chassis 31 of the electronic device 3 is a conductive portion formed using a conductive material such as a conductor of copper, gold, silver, or the like or a compound thereof, and a surface facing the passive electrode 11p in the power transmitting stand 1 functions as a passive electrode. In other words, by causing the chassis 31 of the electronic device 3 to function as the passive electrode, it is possible to increase a facing area between the passive electrode 11p in the power transmitting stand 1 and the passive electrode in the power receiving unit 4 without separately providing a passive electrode having a large size, and it becomes possible to enhance the transmission efficiency of electric power.

It should be appreciated that the chassis 31 is not limited to a case where the whole chassis 31 of the electronic device 3 is formed using a conductive material. Even in a case where a portion of the chassis 31, for example, only a surface facing the passive electrode 11p in the power transmitting stand 1, is configured by a conductive portion formed using a conductive material, it is also possible to expect the same advantageous effect.

In addition, a film including a conductive material may also be formed along the outside or inside of the chassis 31 including an insulating material. Furthermore, the conductive material is not limited to the above-mentioned conductor of copper, gold, silver, or the like or a compound thereof or the like, and even if the conductive material is any one of aluminum, stainless steel, titan, iron, nickel, carbon, brass, and the like, it is possible to expect the same advantageous effect.

Furthermore, it is desirable that, in a state where the electronic device 3 is attached to the power receiving jacket 2 through the connector 26, the chassis 31 of the electronic device 3 and the passive electrode 21p in the power receiving jacket 2 are electrically connected to each other. The reason is that, by the potential of the chassis 31 in the electronic device 3 and the potential of the passive electrode 21p in the power receiving jacket 2 being put into a common potential and the area of the passive electrode 21p being substantially extended, coupling capacitance between passive electrodes is increased and the transmission efficiency of electric power is improved. When a portion of the chassis 31 of the electronic device 3 is formed using a conductive material, it is also possible to expect the same advantageous effect, by electrically connecting a conductive portion formed using the conductive material and the passive electrode 21p in the power receiving jacket 2 to each other.

In addition, it is more desirable that the passive electrode 21p in the power receiving jacket 2 is electrically connected to the passive electrode 11p in the power transmitting stand 1. The reason is that since the passive electrode 21p in the power receiving jacket 2 and the passive electrode 11p in the power transmitting stand 1 are electrically connected to each other, the potential of the passive electrode 21p in the power receiving jacket 2 is stabilized without fluctuation and the transmission efficiency of electric power is further enhanced.

Figure 6:
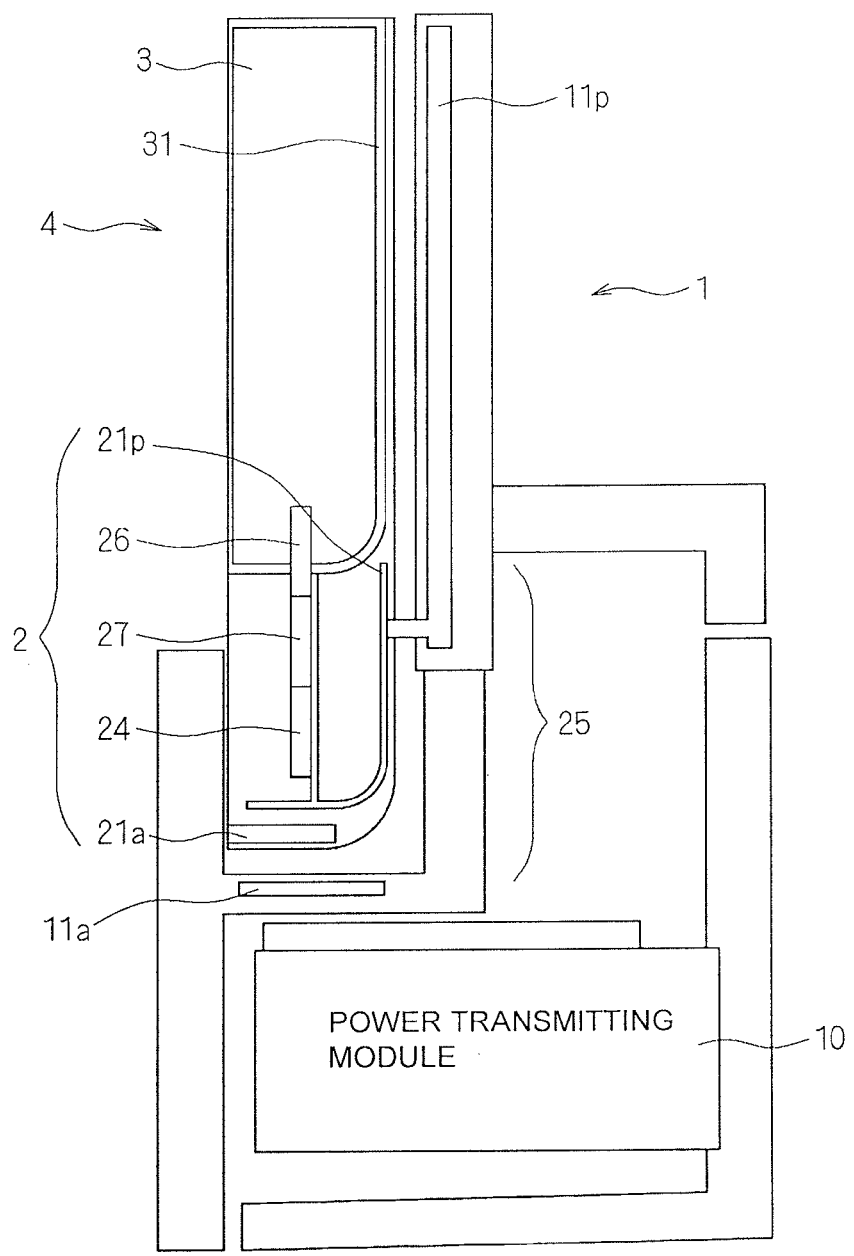
FIG. 6 is a schematic view illustrating another configuration of the power transmission system according to the embodiment 1 of the present invention.

FIG. 6 is a schematic view illustrating another configuration of the power transmission system according to the embodiment 1 of the present invention. Specifically, as illustrated in FIG. 6, the passive electrode 21p in the power receiving jacket 2 is brought into contact with the passive electrode 11p in the power transmitting stand 1 and directly conductively connected thereto. In addition, by connecting the passive electrode 11p in the power transmitting stand 1 to a ground potential of the voltage generation circuit 12, it is possible to further stabilize the potential of the passive electrode 21p in the power receiving jacket 2.

Figure 7:
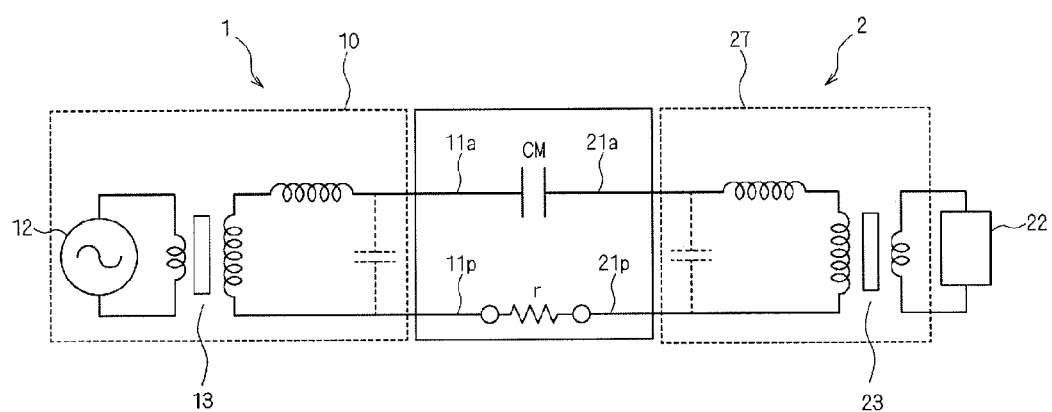
FIG. 7 is a circuit diagram schematically illustrating another configuration of the power transmission system according to the embodiment 1 of the present invention.

FIG. 7 is a circuit diagram schematically illustrating another configuration of the power transmission system according to the embodiment 1 of the present invention. FIG. 7 illustrates a case where the passive electrode 21p in the power receiving jacket 2 is brought into contact with the passive electrode 11p in the power transmitting stand 1 and directly conductively connected thereto. In FIG. 7, capacitance CM corresponds to capacitance between the active electrode (first active electrode) 11a in the power transmitting stand 1 and the active electrode (second active electrode) 21a in the power receiving jacket 2. Resistance r corresponds to contact resistance between the passive electrode (first passive electrode) 11p in the power transmitting stand 1 and the passive electrode (second passive electrode) 21p in the power receiving jacket 2. Since electric power transmission is performed using a stepped-up high voltage of 100 V to 10 kV, a current flowing through the active electrode 11a in the power transmitting stand 1 side may be, for example, about several mA (in other words, may be a current sufficiently smaller than a charging current), and it is not necessary to keep the contact resistance at low level.

As described above, according to the present embodiment 1, when the electronic device 3 to be a target of electric power transmission is attached to the power transmitting stand 1 via the power receiving jacket 2, the conductive portion is included that is formed, using the conductive material, along the whole chassis 31 of the electronic device 3 or at least a surface of the chassis 31 of the electronic device 3, the surface facing the passive electrode 11p in the power transmitting stand 1. Therefore, the conductive portion formed using the conductive material functions as a passive electrode and it is possible to transmit electric power. In addition, since the facing area between the passive electrodes becomes wider, the transmission efficiency of electric power is improved, and it is not necessary to extend the passive electrode 21p in the power receiving jacket 2, it becomes possible to reduce a manufacturing cost.

Figure 8:
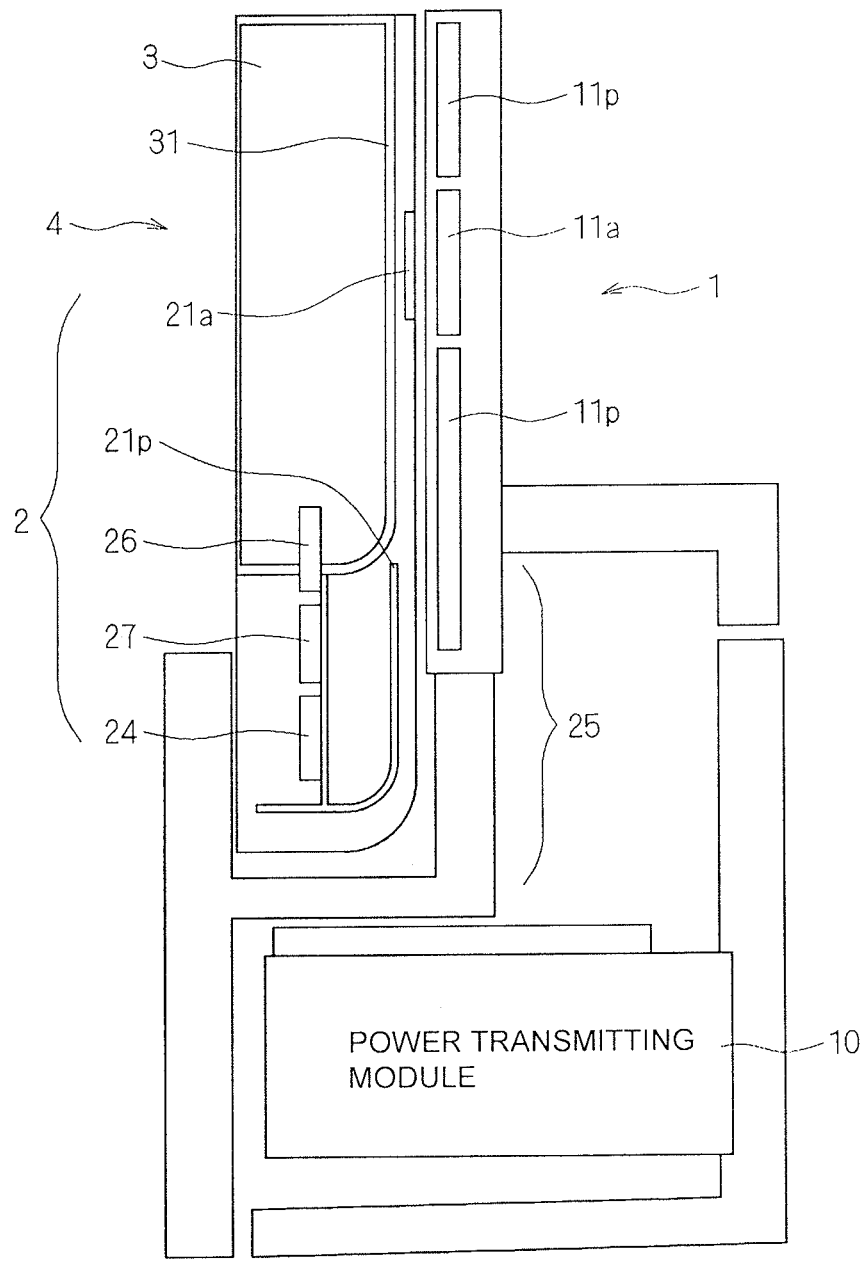
FIG. 8 is a schematic view illustrating a configuration of a power transmission system according to an embodiment 2 of the present invention.

FIG. 8 is a schematic view illustrating the configuration of a power transmission system according to an embodiment 2 of the present invention. In FIG. 8, in the power transmitting stand (power transmitting unit) 1 including the power transmitting module 10, both of the passive electrodes 11p and the active electrode 11a are provided in a surface to which the power receiving jacket 2 is attached and which supports the power receiving jacket 2. The active electrode 11a is disposed nearly in the middle of the surface of the power transmitting stand 1 to which the power receiving jacket 2 is attached and which supports the power receiving jacket 2, and the active electrode 11a is disposed so as to be sandwiched between the two passive electrodes 11p. In other words, the active electrode 11a and the power receiving electrodes 11p in the power transmitting stand 1 are provided at a position (the surface) facing the rear face of the power receiving jacket 2 when the power receiving jacket 2 is attached.

The power receiving unit 4 includes the power receiving jacket 2 to which the electronic device 3 is attachable, and the power receiving jacket 2 includes the power receiving circuit module 27 and the DC-DC converter 24 within the housing portion 25. In the power receiving jacket 2, the active electrode 21a is disposed at a position facing the active electrode 11a provided in the surface of the power transmitting stand 1 to which the power receiving jacket 2 is attached and which supports the power receiving jacket 2, and the passive electrode 21p is disposed at a position facing the passive electrode 11p provided in the surface of the power transmitting stand 1 to which the power receiving jacket 2 is attached and which supports the power receiving jacket 2, the passive electrode 21p being disposed within a range where the housing portion 25 housing the power receiving circuit module 27 and the DC-DC converter 24 stands opposite therewith.

The electronic device 3 is attached to the power receiving jacket 2 through the connector 26. The connector 26 is electrically connected to the power receiving circuit module 27 and the DC-DC converter 24, caused to protrude from the housing portion 25, and conductively connected to the active electrode (second active electrode) 21a and the passive electrode (second passive electrode) 21p.

Figure 9:
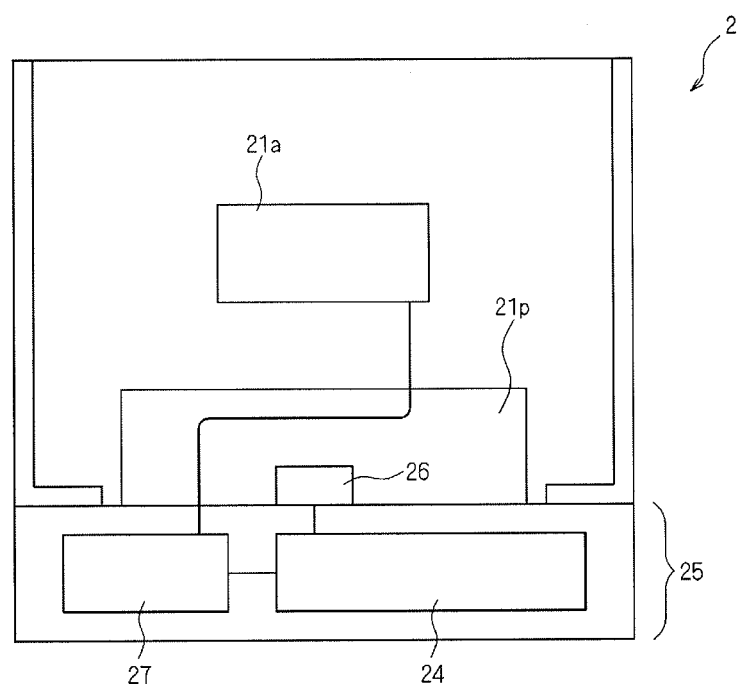
FIG. 9 is a schematic plan view illustrating a configuration of a power receiving jacket according to the embodiment 2 of the present invention.

FIG. 9 is a schematic plan view illustrating the configuration of the power receiving jacket 2 according to the embodiment 2 of the present invention. In the power receiving jacket 2, the active electrode 21a is disposed in the rear face thereof to which the electronic device 3 is attached. The active electrode 21a is electrically connected to the power receiving circuit module 27 through a connection line, and transmits electric power to the load circuit 22 in the electronic device 3 through the DC-DC converter 24 and the connector 26. The passive electrode 21p in the power receiving jacket 2 is only provided on the housing portion 25 side of the surface to which the electronic device 3 is attached.

The chassis 31 of the electronic device 3 is a conductive portion formed using a conductive material such as a conductor of copper, gold, silver, or the like or a compound thereof or the like, and a surface facing the passive electrode 11p in the power transmitting stand 1 functions as a passive electrode. In other words, by causing the chassis 31 of the electronic device 3 to function as the passive electrode, it is possible to increase a facing area between the passive electrode 11p in the power transmitting stand 1 and the passive electrode in the power receiving unit 4 without separately providing a passive electrode having a large size, and it becomes possible to enhance the transmission efficiency of electric power.

It should be appreciated that the chassis 31 is not limited to a case where the whole chassis 31 of the electronic device 3 is configured by a conductive portion formed using a conductive material. By a portion of the chassis 31, for example, only a surface facing the passive electrode 11p in the power transmitting stand 1, being configured by a conductive portion formed using a conductive material, it is also possible to expect the same advantageous effect.

In addition, a film including a conductive material may also be formed along the outside or inside of the chassis 31 including an insulating material. Furthermore, the conductive material is not limited to the above-mentioned conductor of copper, gold, silver, or the like or a compound thereof or the like, and even if the conductive material is any one of aluminum, stainless steel, titan, iron, nickel, carbon, brass, and the like, it is possible to expect the same advantageous effect.

Furthermore, it is desirable that, in a state where the electronic device 3 is attached to the power receiving jacket 2 through the connector 26, the chassis 31 of the electronic device 3 and the passive electrode 21p in the power receiving jacket 2 are electrically connected to each other. The reason is that since, by the potential of the chassis 31 in the electronic device 3 and the potential of the passive electrode 21p in the power receiving jacket 2 being put into a common potential, the chassis 31 of the electronic device 3 functions as an extension portion of the passive electrode 21p in the power receiving jacket 2, coupling capacitance between passive electrodes increases and the transmission efficiency of electric power is improved. It should be appreciated that when a portion of the chassis 31 of the electronic device 3 is configured by the conductive portion formed using a conductive material, it is also possible to expect the same advantageous effect, by electrically connecting the conductive portion formed using the conductive material and the passive electrode 21p in the power receiving jacket 2 to each other.

In addition, it is more desirable that the passive electrode 21p in the power receiving jacket 2 is electrically connected to the passive electrode 11p in the power transmitting stand 1. The reason is that since the passive electrode 21p in the power receiving jacket 2 and the passive electrode 11p in the power transmitting stand 1 are electrically connected to each other, the potential of the passive electrode 21p in the power receiving jacket 2 is stabilized without fluctuation and the transmission efficiency of electric power is further improved.

Furthermore, the active electrode 21a in the power receiving jacket 2 is disposed in the rear face to which the electronic device 3 is attached. Accordingly, even if the power receiving jacket 2 is vertically disposed in and attached to the power transmitting stand 1 or transversely disposed in and attached to the power transmitting stand 1, it is possible for the active electrode 11a in the power transmitting stand 1 and the active electrode 21a in the power receiving jacket 2 to secure a sufficient facing area. Accordingly, even if the power receiving jacket 2 is vertically disposed in and attached to the power transmitting stand 1 or transversely disposed in and attached to the power transmitting stand 1, it becomes possible to effectively transmit electric power without depending on a direction in which the power receiving jacket 2 is attached.

As described above, according to the present embodiment 2, when the electronic device 3 to be a target of electric power transmission is attached to the power transmitting stand 1 via the power receiving jacket 2, since the conductive portion is included that is formed, using the conductive material, along the whole chassis 31 of the electronic device 3 or at least a surface of the chassis 31 of the electronic device 3, the surface facing the passive electrode 11p in the power transmitting stand 1. Therefore, the conductive portion functions as a passive electrode in the power receiving jacket 2 and it is possible to transmit electric power. In addition, since the facing area between the passive electrodes becomes wider, the transmission efficiency of electric power is improved, and it is not necessary to extend the passive electrode 21p in the power receiving jacket 2, it becomes possible to reduce a manufacturing cost. Furthermore, since the active electrode 21a in the power receiving jacket 2 is provided at the position facing the active electrode 11a in the power transmitting stand 1, even if the power receiving jacket 2 is vertically disposed in and attached to the power transmitting stand 1 or transversely disposed in and attached to the power transmitting stand 1, it becomes possible to effectively transmit electric power without depending on a direction in which the power receiving jacket 2 is attached.

Figure 10:
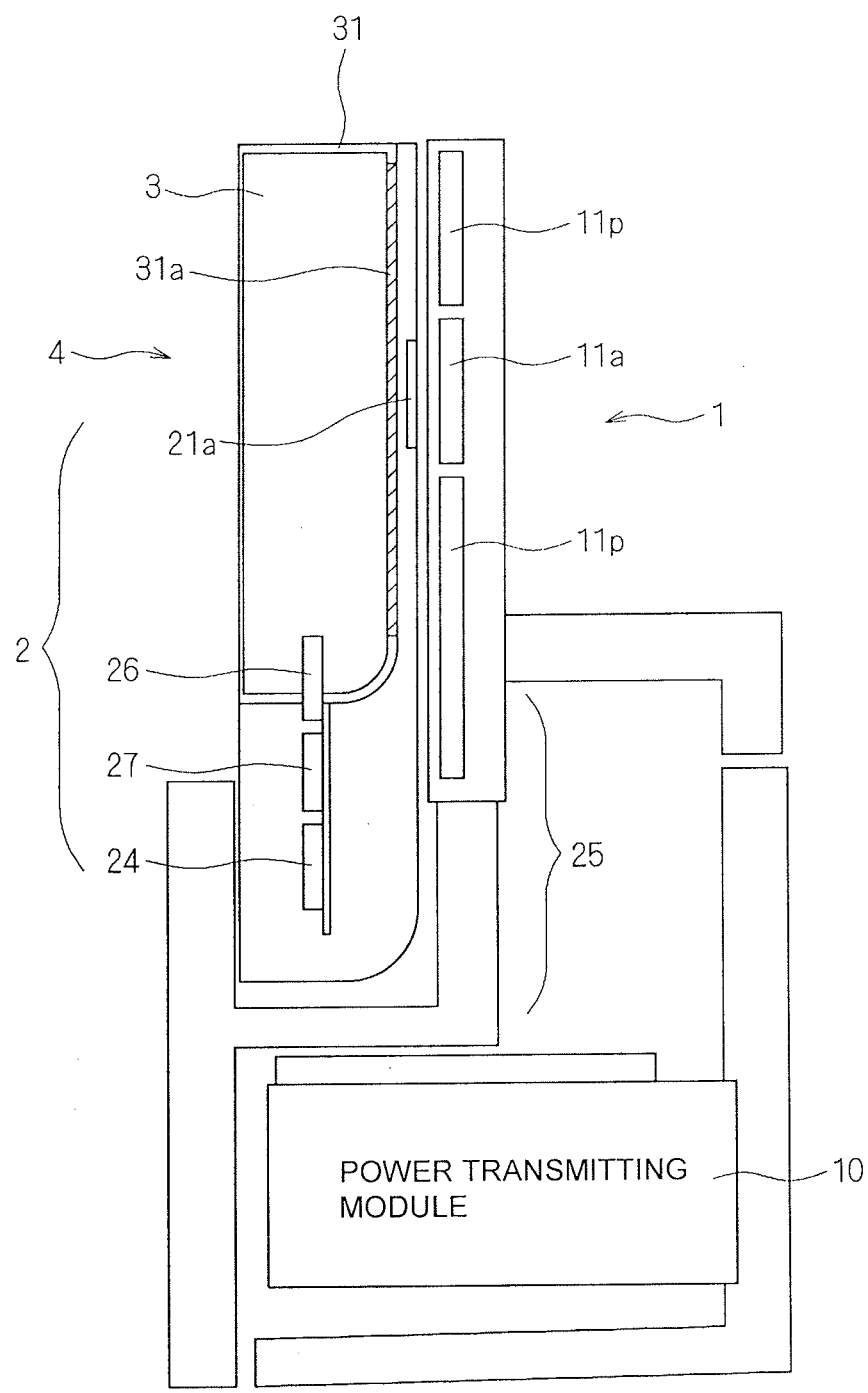
FIG. 10 is a schematic view illustrating a configuration of a power transmission system according to an embodiment 3 of the present invention.

FIG. 10 is a schematic view illustrating the configuration of a power transmission system according to an embodiment 3 of the present invention. In FIG. 10, in the power transmitting stand (power transmitting unit) 1 including the power transmitting module 10, both of the passive electrodes 11p and the active electrode 11a are provided in a surface to which the power receiving jacket 2 is attached and which supports the power receiving jacket 2. The active electrode 11a is disposed nearly in the middle of the surface of the power transmitting stand 1 to which the power receiving jacket 2 is attached and which supports the power receiving jacket 2, and the active electrode 11a is disposed so as to be sandwiched between the two passive electrodes 11p. In other words, the active electrode 11a and the power receiving electrodes 11p in the power transmitting stand 1 are provided at a position (the surface) facing the rear face of the power receiving jacket 2 when the power receiving jacket 2 is attached.

The power receiving unit 4 includes the power receiving jacket 2 to which the electronic device 3 is attachable, and the power receiving jacket 2 includes the power receiving circuit module 27 and the DC-DC converter 24 within the housing portion 25. In the power receiving jacket 2, the active electrode 21a is disposed at a position facing the active electrode 11a provided in the surface of the power transmitting stand 1 to which the power receiving jacket 2 is attached and which supports the power receiving jacket 2. The present embodiment 3 is different from the embodiment 2 in that the passive electrode 21p is not disposed at a position facing the passive electrode 11p provided in the surface of the power transmitting stand 1 to which the power receiving jacket 2 is attached and which supports the power receiving jacket 2, the passive electrode 21p not being disposed within a range where the housing portion 25 stands opposite therewith.

In this case, by causing the portion (conductive portion) 31a of the chassis 31 of the electronic device 3, formed using a conductive material, to function as the passive electrode 21p of the power receiving jacket 2, it is possible to make coupling capacitance between the passive electrodes sufficiently large.

The electronic device 3 is attached to the power receiving jacket 2 through the connector 26. The connector 26 is electrically connected to the power receiving circuit module 27 and the DC-DC converter 24, caused to protrude from the housing portion 25, and conductively connected to the active electrode (second active electrode) 21a.

The chassis 31 of the electronic device 3 is a conductive portion formed using a conductive material such as a conductor of copper, gold, silver, or the like or a compound thereof or the like, and a surface facing the passive electrode 11p in the power transmitting stand 1 functions as a passive electrode. In other words, by causing the chassis 31 of the electronic device 3 to function as the passive electrode, it is possible to increase a facing area between the passive electrode 11p in the power transmitting stand 1 and the passive electrode in the power receiving unit 4 without separately providing a passive electrode having a large size, and it becomes possible to enhance the transmission efficiency of electric power.

It should be appreciated that the chassis 31 is not limited to a case where the whole chassis 31 of the electronic device 3 is configured by a conductive portion formed using a conductive material. By a portion of the chassis 31, for example, only a surface facing the passive electrode 11p in the power transmitting stand 1, being configured by a conductive portion formed using a conductive material, it is also possible to expect the same advantageous effect.

In addition, a film including a conductive material may also be formed along the outside or inside of the chassis 31 including an insulating material. Furthermore, the conductive material is not limited to the above-mentioned conductor of copper, gold, silver, or the like or a compound thereof or the like, and even if the conductive material is any one of aluminum, stainless steel, titan, iron, nickel, carbon, brass, and the like, it is possible to expect the same advantageous effect.

Furthermore, it is desirable that, in a state where the electronic device 3 is attached to the power receiving jacket 2 through the connector 26, the chassis 31 of the electronic device 3 and the power receiving circuit module 27 in the power receiving jacket 2 are electrically connected to each other. The reason is that since, by the potential of the chassis (conductive portion) 31 in the electronic device 3 and the power receiving circuit module 27 in the power receiving jacket 2 being connected to each other, the chassis (conductive portion) 31 of the electronic device 3 functions as a passive electrode in the power receiving jacket 2, coupling capacitance between passive electrodes increases and the transmission efficiency of electric power is improved. It should be appreciated that when only a portion of the chassis 31 of the electronic device 3 is configured by the conductive portion 31a formed using a conductive material, it is also possible to expect the same advantageous effect, by electrically connecting the conductive portion 31a formed using the conductive material and the power receiving circuit module 27 in the power receiving jacket 2 to each other.

In addition, the active electrode 21a in the power receiving jacket 2 is disposed in the rear face to which the electronic device 3 is attached. Accordingly, even if the power receiving jacket 2 is vertically disposed in and attached to the power transmitting stand 1 or transversely disposed in and attached to the power transmitting stand 1, it is possible for the active electrode 11a in the power transmitting stand 1 and the active electrode 21a in the power receiving jacket 2 to secure a sufficient facing area. Accordingly, even if the power receiving jacket 2 is vertically disposed in the power transmitting stand 1 or transversely disposed in the power transmitting stand 1, it becomes possible to effectively transmit electric power without depending on a direction in which the power receiving jacket 2 is attached.

As described above, according to the present embodiment 3, when the electronic device 3 to be a target of electric power transmission is attached to the power transmitting stand 1 via the power receiving jacket 2, since the conductive portion 31a is included that is formed, using the conductive material along the whole chassis 31 of the electronic device 3 or at least a surface of the chassis 31 of the electronic device 3, the surface of the chassis 31 faces the passive electrode 11p in the power transmitting stand 1. Therefore, a portion (including the conductive portion 31a) formed using the conductive material functions as a passive electrode in the power receiving unit 4 and it is possible to transmit electric power. In addition, since it is not necessary to separately provide a passive electrode in the power receiving jacket 2, it becomes possible to reduce a manufacturing cost. Furthermore, since the active electrode 21a in the power receiving jacket 2 is provided at the position facing the active electrode 11a in the power transmitting stand 1, even if the power receiving jacket 2 is vertically disposed in and attached to the power transmitting stand 1 or transversely disposed in and attached to the power transmitting stand 1, it becomes possible to effectively transmit electric power without depending on a direction in which the power receiving jacket 2 is attached.

In addition, the present invention is not limited to the above-mentioned embodiments, and it is to be understood that various modifications, various substitutions, or the like will be available without departing from the spirit of the invention. For example, the electronic device 3 may be a portable electronic device or a stationary electronic device.

DESCRIPTION OF REFERENCE SYMBOLS 1 power transmitting stand (power transmitting device)
2 power receiving jacket
3 electronic device
4 power receiving unit
10 power transmitting module
11 coupling electrode (first coupling electrode)
11a active electrode (first active electrode)
11p passive electrode (first passive electrode)
12 voltage generation circuit
13 step-up transformer
21 coupling electrode (second coupling electrode)
21a active electrode (second active electrode)
21p passive electrode (second passive electrode)
22 load circuit
23 step-down transformer
24 DC-DC converter
25 housing portion
26 connector
27 power receiving circuit module
31 chassis (conductive portion)
31a conductive portion

The invention claimed is:

1. A power transmission system comprising:
a power transmitting device having a first passive electrode, a first active electrode with a potential higher than the first passive electrode, and a voltage generation circuit coupled between the first passive electrode and the first active electrode;
a power receiving jacket having a second active electrode and a power receiving circuit module coupled to the second active electrode; and
an electronic device attachable to the power receiving jacket,
wherein the electronic device includes a chassis with a conductive portion disposed on a surface of the chassis, such that when the power receiving jacket is attached to the power transmitting device, the conductive portion of the chassis faces the first passive electrode and the power receiving circuit module is electrically coupled between the conductive portion and the second active electrode.

2. The power transmission system according to claim 1, wherein the power receiving jacket includes a second passive electrode electrically coupled to the conductive portion.

3. The power transmission system according to claim 2, wherein the second passive electrode is electrically connected to the first passive electrode when the power receiving jacket is attached to the power transmitting device.

4. The power transmission system according to claim 1, wherein the first active electrode and the first passive electrode are both provided in a surface to face the power receiving jacket when the power receiving jacket is attached to the power transmitting device, and
wherein the second active electrode in the power receiving jacket is positioned to face the first active electrode in the power transmitting device.

5. The power transmission system according to claim 4, wherein the first passive electrode is positioned adjacent to a first end of the first active electrode, and wherein the power transmitting device further comprises a third passive electrode that is positioned on a second end of the first active electrode opposite the first end.

6. The power transmission system according to claim 1, wherein the surface of the chassis is one of an outer surface and an inner surface and a conductive material is disposed on at least one of the outer surface and the inner surface.

7. The power transmission system according to claim 6, wherein the conductive material is selected from the group consisting of copper, gold and silver.

8. A power receiving unit for receiving electric power in a non-contact manner from a power transmitting device that includes a first passive electrode, a first active electrode with a potential higher than the first passive electrode, and a voltage generation circuit coupled between the first passive electrode and the first active electrode, the power receiving unit comprising:
a power receiving jacket having a second active electrode;
a power receiving circuit module configured to be coupled to the second active electrode; and
an electronic device attachable to the power receiving jacket, the electronic device including a chassis with a conductive portion disposed on a surface of the chassis, and
wherein, when the electronic device is attached to the power receiving jacket and the power receiving jacket is attached to the power transmitting device, the conductive portion of the chassis faces the first passive electrode and the power receiving circuit module is electrically coupled between the conductive portion and the second active electrode.

9. The power receiving unit according to claim 8, wherein the power receiving jacket further comprises a second passive electrode that is electrically connected to the first passive electrode of the power transmitting device when the power receiving jacket is attached to the power transmitted device.

10. The power receiving unit according to claim 8, wherein the second active electrode of the power receiving jacket is disposed at a position to face the first active electrode of the power transmitting device when the power receiving unit is attached to the power transmitting device.

11. The power receiving unit according to claim 8, wherein the surface of the chassis of the electronic device is one of an outer surface and an inner surface and a conductive material is disposed on at least one of the outer surface and the inner surface.

12. The power receiving unit according to claim 11, wherein the conductive material is selected from the group consisting of copper, gold and silver.

13. A power receiving jacket for receiving electric power in a non-contact manner from a power transmitting device that includes a first passive electrode, a first active electrode with a potential higher than the first passive electrode, and a voltage generation circuit coupled between the first passive electrode and the first active electrode, the power receiving jacket comprising:
a second active electrode; and
a power receiving circuit module configured to be coupled to the second active electrode,
wherein the power receiving jacket is attachable to an electronic device that includes a chassis with a conductive portion disposed on a surface of the chassis, and
wherein, when the electronic device is attached to the power receiving jacket and the power receiving jacket is attached to the power transmitting device, the conductive portion of the chassis faces the first passive electrode and the power receiving circuit module is electrically coupled between the conductive portion and the second active electrode.

14. The power receiving jacket according to claim 13, further comprising a second passive electrode that is electrically connected to the first passive electrode of the power transmitting device when the power receiving jacket is attached to the power transmitted device.

15. The power receiving jacket according to claim 13, wherein the second active electrode of the power receiving jacket is disposed at a position to face the first active electrode of the power transmitting device when the power receiving jacket is attached to the power transmitting device.

16. The power receiving jacket according to claim 13, wherein the surface of the chassis of the electronic device is one of an outer surface and an inner surface and a conductive material is disposed on at least one of the outer surface and the inner surface.

17. The power receiving jacket according to claim 16, wherein the conductive material is selected from the group consisting of copper, gold and silver.

* * * * *